US009779236B2

(12) United States Patent
Abrams et al.

(10) Patent No.: US 9,779,236 B2
(45) Date of Patent: *Oct. 3, 2017

(54) RISK ASSESSMENT MODELING

(71) Applicant: MICROSOFT TECHNOLOGY LICENSING, LLC, Redmond, WA (US)

(72) Inventors: Luke Abrams, London (GB); David J. Steeves, Seattle, WA (US); Robert Alexander Sim, Bellevue, WA (US); Pui-Yin Winfred Wong, Redmond, WA (US); Harry Simon Katz, Bellevue, WA (US); Aaron Small, Seattle, WA (US); Dana Scott Kaufman, Redmond, WA (US); Adrian Kreuziger, Seattle, WA (US); Mark A. Nikiel, North Bend, WA (US); Laurentiu Bogdan Cristofor, Redmond, WA (US); Alexa Lynn Keizur, Redmond, WA (US); Collin Tibbetts, Seattle, WA (US); Charles Hayden, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,639

(22) Filed: Jun. 21, 2016

(65) Prior Publication Data
US 2016/0300059 A1 Oct. 13, 2016

Related U.S. Application Data

(63) Continuation of application No. 14/283,996, filed on May 21, 2014, now Pat. No. 9,396,332.

(51) Int. Cl.
*G06F 21/55* (2013.01)
*G06N 99/00* (2010.01)
(Continued)

(52) U.S. Cl.
CPC ............ *G06F 21/55* (2013.01); *G06F 21/316* (2013.01); *G06F 21/552* (2013.01);
(Continued)

(58) Field of Classification Search
CPC . H04L 63/1425; H04L 63/1416; H04L 67/22; H04L 63/0263
See application file for complete search history.

(56) References Cited

U.S. PATENT DOCUMENTS

| 7,272,728 B2 | 9/2007 | Pierson et al. |
| 8,019,678 B2 | 9/2011 | Wright et al. |

(Continued)

OTHER PUBLICATIONS

"An Update on Our War Against Account Hijackers", Retrieved from: <<http://googleblog.blogspot.com/2013/02/an-update-on-our-war-against-account.html>>, Feb. 19, 2013, 9 Pages.

(Continued)

*Primary Examiner* — James Turchen
(74) *Attorney, Agent, or Firm* — Workman Nydegger

(57) ABSTRACT

One or more techniques and/or systems are provided for risk assessment. Historical authentication data and/or compromised user account data may be evaluated to identify a set of authentication context properties associated with user authentication sessions and/or a set of malicious account context properties associated with compromised user accounts (e.g., properties indicative of whether a user recently visited a malicious site, created a fake social network profile, logged in from unknown locations, etc.). The set of authentication context properties and/or the set of malicious account context properties may be annotated to create an annotated context property training set that may be used to train a risk assessment machine learning model to generate a risk assessment model. The risk assessment model may be used to evaluate user context properties of a
(Continued)

user account event to generate a risk analysis metric indicative of a likelihood the user account event is malicious or safe.

19 Claims, 11 Drawing Sheets

(51) Int. Cl.
*H04L 29/08* (2006.01)
*G06F 21/31* (2013.01)
*H04L 29/06* (2006.01)

(52) U.S. Cl.
CPC .......... *G06F 21/554* (2013.01); *G06N 99/00* (2013.01); *G06N 99/005* (2013.01); *H04L 63/0263* (2013.01); *H04L 63/1416* (2013.01); *H04L 67/22* (2013.01); *G06F 2221/034* (2013.01); *G06F 2221/2111* (2013.01); *H04L 63/1425* (2013.01)

(56) References Cited

U.S. PATENT DOCUMENTS

| | | |
|---|---|---|
| 8,396,890 B2 | 3/2013 | Lim |
| 8,548,904 B1 | 10/2013 | Bear et al. |
| 8,613,064 B1 | 12/2013 | Roy |
| 8,732,825 B2* | 5/2014 | Park ................ G06F 21/562 726/22 |
| 8,875,267 B1 | 10/2014 | Kolman et al. |
| 9,122,866 B1* | 9/2015 | Kolman ............. G06F 21/46 |
| 9,154,516 B1* | 10/2015 | Vaystikh .......... H04L 63/1425 |
| 9,160,726 B1* | 10/2015 | Kaufman |
| 9,191,398 B2* | 11/2015 | Bolzoni ............. H04L 43/00 |
| 9,288,217 B2* | 3/2016 | Kirkham ........... H04L 63/126 |
| 2008/0222706 A1* | 9/2008 | Renaud ........... H04L 63/1408 726/4 |
| 2011/0131131 A1 | 6/2011 | Griffin et al. |
| 2011/0154452 A1* | 6/2011 | Novack .................. H04L 63/08 726/5 |
| 2011/0196791 A1* | 8/2011 | Dominguez ........... G06Q 40/00 705/44 |
| 2011/0225625 A1 | 9/2011 | Wolfson et al. |
| 2011/0296003 A1 | 12/2011 | McCann et al. |
| 2012/0109821 A1 | 5/2012 | Barbour et al. |
| 2012/0272316 A1 | 10/2012 | Clevy et al. |
| 2012/0297477 A1 | 11/2012 | Raviv |
| 2013/0091573 A1* | 4/2013 | Herz ................. H04L 63/1433 726/23 |
| 2013/0110715 A1 | 5/2013 | Buchhop |
| 2013/0218765 A1* | 8/2013 | Hammad ............. G06Q 30/06 705/41 |
| 2014/0115703 A1* | 4/2014 | Penton ................ G06F 21/554 726/23 |
| 2014/0189835 A1* | 7/2014 | Umerley ............. G06F 21/40 726/7 |
| 2014/0289867 A1* | 9/2014 | Bukai ............... G06Q 20/4016 726/28 |
| 2014/0325220 A1* | 10/2014 | Tunnell ................ G06F 21/00 713/168 |

OTHER PUBLICATIONS

"Notice of Allowance Issued in U.S. Appl. No. 14/283,996", dated Apr. 19, 2016, 15 Pages.

"Non-Final Office Action Issued in U.S. Appl. No. 14/283,996", dated Oct. 22, 2015, 15 Pages.

Chow, et al., "Authentication in the Clouds: A Framework and its Application to Mobile Users", In Proceedings of the ACM workshop on Cloud Computing Security Workshop, Oct. 8, 2010, 6 Pages.

Poolsappasit, et al., "Dynamic Security Risk Management Using Bayesian Attack Graphs", In IEEE Transactions on Dependable and Secure Computing, vol. 9, Issue 1, Jan. 2012, pp. 61-74.

* cited by examiner

HISTORICAL AUTHENTICATION DATA

- USER (A) VISITED WWW.WEHACK.COM

- USER (A) HAS A USER (A) SOCIAL NETWORK PROFILE WITH A LOCATION NOT MATCHING AN IP ADDRESS LOCATION OF DEVICE USED TO LOG INTO USER (A) BANK ACCOUNT WEBSITE

- USER (A) INTERACTED WITH A DEVICE USING NON-HUMAN KEYSTROKE PATTERNS

- USER (A) UNSUCCESSFULLY ATTEMPTED LARGE PURCHASE TRANSACTIONS AT VARIOUS RETAIL WEBSITES

- ...

- USER (B) TENDS TO LOG INTO USER (B) DEVICE FROM LOCATIONS MATCHING A USER (B) SOCIAL NETWORK PROFILE

- USER (B) INTERACTED WITH USER (B) DEVICE WITH HUMAN KEYSTROKES AND MOUSE INPUTS

- USER (B) EMAIL ACCOUNT DOES NOT APPEAR TO BE COMPROMISED

- ...

- USER (C)

RISK ASSESSMENT MODELING

CROSS-REFERENCE TO RELATED APPLICATIONS

This application is a continuation of U.S. patent application Ser. No. 14/283,996 filed on May 21, 2014, entitled "RISK ASSESSMENT MODELING," which issued as U.S. Pat. No. 9,396,332 on Jul. 19, 2016, and which application is expressly incorporated herein by reference in its entirety.

BACKGROUND

Various security techniques may be implemented to protect accounts and/or sensitive information contained therein. In an example, a bank may require a user name and password to access bank account information through a bank website. As an additional level of security, a one-time code may be sent to a registered device and/or email account, for example, where the one-time code may be provided back for authentication purposes, such as where a user wishes to recover a forgotten user name and/or password, for example.

BRIEF SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for risk assessment are provided. Historical authentication data may be evaluated (e.g., given user consent) to identify a set of authentication context properties associated with user authentication sessions (e.g., contextual information related to one or more users accessing one or more accounts). Compromised user account data may be evaluated (e.g., given user consent) to identify a set of malicious account context properties associated with compromised user accounts and/or compromised user authentication events (e.g., contextual information related to one or more users accessing one or more accounts identified as being compromised). A user may take affirmative action to provide opt-in consent to allow access to and/or use of historical authentication data and/or compromised user account data, such as for the purpose of risk assessment (e.g., where the user responds to a prompt regarding the collection and/or user of such information). Terms of use may provide a user with notice of the use and/or collection of historical authentication data and/or compromised user account data, such as for the purpose of risk assessment, for example.

The set of authentication context properties and/or the set of malicious account context properties may be annotated to create an annotated context properties training set (e.g., authentication context property patterns and/or user account context property patterns may be labeled as safe or malicious). A risk assessment machine learning module may be trained based upon the annotated context properties training set to generate a risk assessment model. The risk assessment model may comprise one or more machine learning structures (e.g., one or more boosted ensembles such as random forests, adaboost, logitboost, etc.) and/or other data structures and/or functionality that may be used to evaluate whether current user account events (e.g., an authentication event, a password change event, a new account creation event, an authentication proof change event, a purchase event, etc.) are safe or malicious.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

BRIEF DESCRIPTION OF THE DRAWINGS

FIG. 2A is an illustration of exemplary historical authentication data.

DETAILED DESCRIPTION

Figure 1:
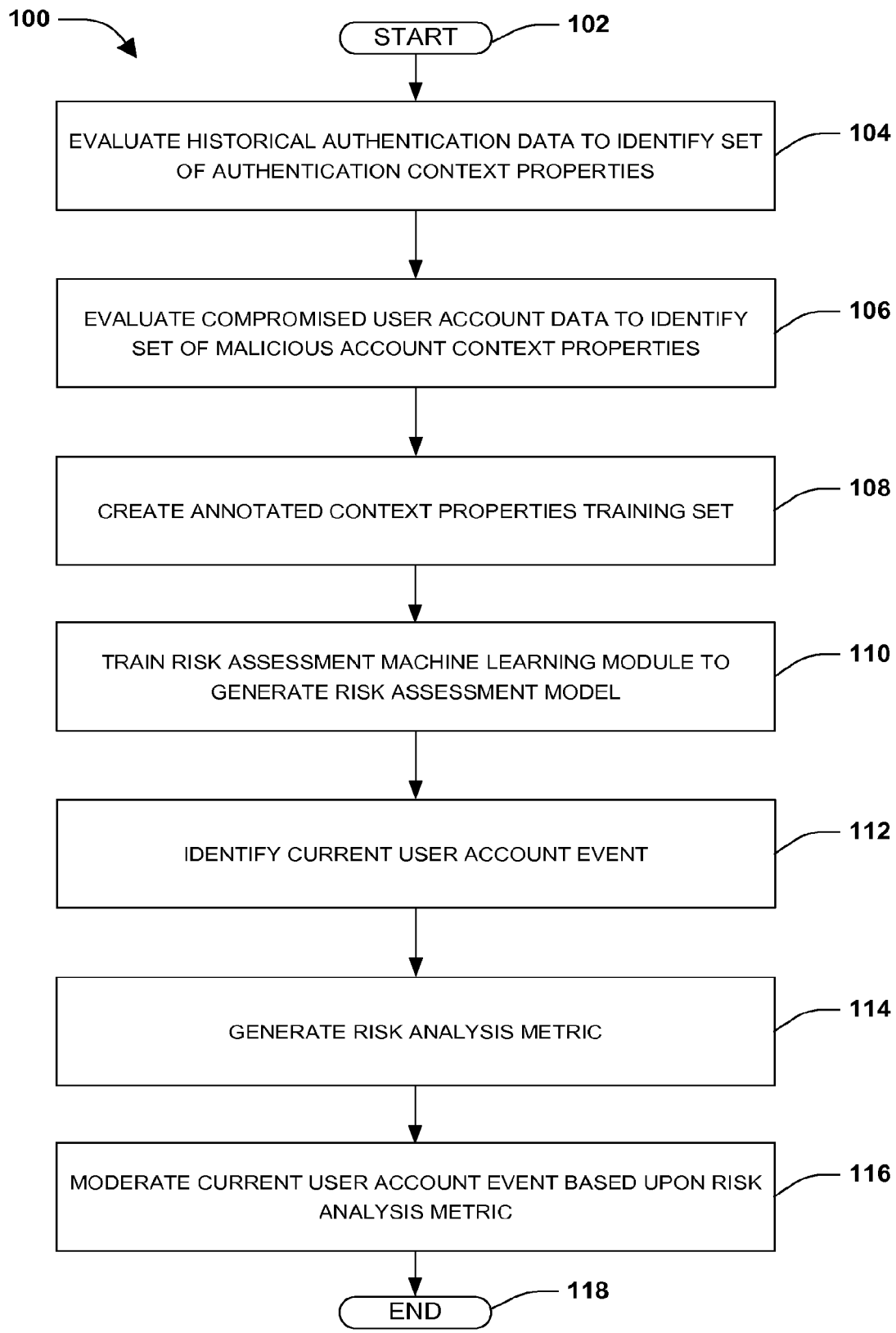
FIG. 1 is a flow diagram illustrating an exemplary method of risk assessment.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for risk assessment are provided herein. Various information may be used to train a risk assessment machine learning module to create a risk assessment model that may be used to generate risk analysis metrics used to moderate user account events. For example, historical authentication data and/or compromised user account data may be evaluated (e.g., given user consent) to identify authentication context properties and/or malicious account context properties that may be used to train the risk assessment machine learning module. A user may take affirmative action to provide opt-in consent to allow access to and/or use of historical authentication data and/or compromised user account data, such as for the purpose of risk assessment (e.g., where the user responds to a prompt regarding the collection and/or user of such data). In an example, machine learning structure (e.g., a boosted ensemble such as random forests, adaboost, logitboost, etc.) may be generated for inclusion within the risk assessment model based upon the authentication context properties and/or the malicious account context properties. In this way, current user account events may be moderated using risk analysis metrics generated by the risk assessment model. For example, a current user may be blocked from accessing an account until a user response is received, a reputation of a user may be demoted, etc.

An embodiment of risk assessment is illustrated by an exemplary method 100 of FIG. 1. At 102, the method starts. At 104, historical authentication data may be evaluated (e.g., given user consent) to identify a set of authentication context properties associated with user authentication sessions. For example, various telemetry associated with one or more users may be evaluated to identify the set of authentication context properties, such as browsing history, prior geolocations, devices utilized, services utilized, user contacts, user captcha history, social network posts, microblog messages, emails, calendar entries, subscriptions, device input patterns such as keystrokes per minute, IP address locations, information about a target service, a likelihood of abusing the target service, recent authentication failure rates for the target service, user activities, transaction histories, user provided information such as phone numbers, whether a user is associated with a past (e.g., credit card) breach, etc. A user may take affirmative action to provide opt-in consent to allow access to and/or use of the telemetry, such as for the purpose of risk assessment (e.g., where the user responds to a prompt regarding the collection and/or user of such information). The set of authentication context properties may correlate authentication context property patterns (e.g., user profile location to IP address location mismatch, user browsing history, user subscriptions, etc.) with either safe or malicious authentication tendencies.

At 106, compromised user account data may be evaluated (e.g., given user consent) to identify a set of malicious account context properties associated with compromised user accounts and/or compromised user authentication events. A user may take affirmative action to provide opt-in consent to allow access to and/or use of compromised user account data, such as for the purpose of risk assessment (e.g., where the user responds to a prompt regarding the collection and/or user of such data). In an example, various compromise detection algorithms, such as a compromised email account detection algorithm, a compromised social network account detection algorithm, a malware detection algorithm, etc., may collect the compromised user account data, such as by acting upon at least some of the aforementioned telemetry. In an example, the compromised user account data may comprise and/or describe malicious code executing on a user device. In another example, the compromised user account data may comprise and/or describe user self-detected compromised signals (e.g., a user may review user related activities, such as authentication records, on an account activity page and may flag a particular activity as a compromised activity, likely carried out by a malicious party). The set of malicious account context properties may correlate contextual information (e.g., keystrokes of a user, email usage, social network profile posting information, etc.) with either normal user account usage or compromised user account usage.

At 108, the set of authentication context properties and/or the set of malicious account context properties may be annotated to create an annotated context properties training set. In an example, a first set of historical authentication data associated with malicious user authentication events may be identified. Authentication context properties of the first set of historical authentication data may be evaluated to identify an authentication context property pattern indicative of malicious user authentication (e.g., users that visited a known malicious website may be likely to be malicious or at least compromised users). The authentication context property pattern may be annotated as malicious to create a malicious authentication context property pattern for inclusion within the annotated context properties training set.

In another example, the set of malicious account context properties may be evaluated to identify a user account context property pattern indicative of a compromised user account (e.g., multiple user logins from various countries within a threshold timespan may indicate that a user account has been taken over by a malicious user and is being exploited). The user account context property pattern may be annotated as malicious to create a malicious user account context property pattern for inclusion within the annotated context property training set. In this way, the annotated context property training set may comprise various properties indicative of safe or malicious user account events, such as a user browsing history property, a geolocation property, a target service property (e.g., indicative of a target service accessed by a compromised user), a social network profile property (e.g., a high rate of social network posts promoting malicious websites), an application execution context property (e.g., execution of a trusted or untrusted application), a client device property (e.g., access from a device not known to be associated with a user but using credentials of the user), a device interaction property (e.g., keystrokes per minute above a human capability threshold), authentication challenged history property (e.g., an amount of failed authentication challenges by a user for various services), a user contact list (e.g., malicious or safe user contacts), a user activity property (e.g., messaging history, application interaction, account creation, etc.), etc.

In another example, the annotated context properties training set comprises statistics about annotated context properties (e.g., counts, averages, velocities, etc.) and/or learned meta-patterns (e.g., a combination of multiple properties (e.g., property X combined with property Y combined with property Z, etc.) to form a new context property, such as pre-training with deep neural nets and/or grouping accounts using k-means clustering and using a resulting/corresponding account cluster ID as an additional context property). In another example, the annotated context properties training set comprises annotated context properties from non-malicious accounts, such as an email outbound event count for benign accounts. In this way, annotated context properties within the annotated context properties training set represent malicious and benign context properties.

At 110, a risk assessment machine learning model may be trained (e.g., supervised, semi-supervised, or unsupervised) based upon the annotated context properties training set to generate a risk assessment model. In an example, one or more machine learning structures may be generated for inclusion within the risk assessment model. A machine learning structure may indicate that one or more user context properties are indicative of either a malicious user account event or a safe user account event. The machine learning structure may comprise one or more decision structures for malicious authentication context property patterns and/or malicious user account context property patterns. A decision structure may specify that a user context property (e.g., of a current user account event, such as creation of a new account, being evaluated in real-time) may be indicative of a malicious user account event where the user context property corresponds to one or more malicious authentication context property patterns and/or one or more malicious user account context property patterns (e.g., a current user, attempting to create the new account, may have visited a malicious website that other compromised user accounts visited, and thus may be considered suspect).

The risk assessment model may be utilized to identify safe or malicious user account events (e.g., an authentication event, a password change event, a user account creation event, a proof change event, a purchase event, a social network post event, a send email event, a phone call event, etc.). At 112, a current user account event of a current user may be identified (e.g., the current user may attempt to create an electronic payment service account). At 114, a current user context property of the current user may be evaluated using the risk assessment model to generate a risk analysis metric (e.g., a value corresponding to a potential risk/amount of maliciousness or non-maliciousness and/or a confidence of such an assessment). For example, the risk analysis metric may indicate that the current user account event may have a high likelihood of being malicious based upon the current user context property indicating that the current user recently visited a known malicious website, has an abnormal social network profile (e.g., merely a picture and links to malicious websites), and has interacted with a client device using keystroke input that is faster than a rate at which a human is capable of typing. Such current user context properties may match one or more decision structures within the risk assessment model, which may lead to an assessment that the current user account event may be malicious.

In an example, a plurality of risk assessment models may be maintained and available for evaluating the current user account event. A predefined criteria, such as a type of user (e.g., gender, age, profession such as a job role that may entail wide spread email distribution of information to a vast number of users, computer skill level, etc.), a location, a random selection, and/or a variety of other criteria may be used to select a risk assessment model for evaluating the current user account event. In an example, more than one risk assessment model may be used to evaluate the current user account event, and various actions may be taken based upon results from respective risk assessment models. For example, results from multiple risk assessment models may be aggregated (e.g., based upon weightings of models/results, etc.) to determine a particular action (e.g., authentication challenge). A first result from a first risk assessment model may be selected from among other results from other risk assent models, such as based upon a relevance of the first risk assessment model to a user characteristic (e.g., risk assessment model corresponds to job description of user, etc.). Based upon user response to first result from a first risk assessment model, a second result from a second risk assessment model may be selected from among other results from other risk assent models, etc.

At 116, the current user account event may be moderated based upon the risk analysis metric. For example, the current user may be blocked until a user response is received, the current user may be blocked for a current session of the current user account event, an authentication challenge may be provided to the current user, restricted access may be provided to a destination (e.g., browsing, but not purchasing, access may be provided to a shopping website), a reputation of the current user may be demoted, etc. It will be appreciated that a wide variety of moderation may be used, such as zero moderation, friction moderation, or blocking moderation for various scenarios. User feedback (e.g., a user passing a user authentication challenge, a user authentication challenge failure result, an un-attempted user authentication challenge result, etc.) to the moderation of the current user account event may be received. The risk assessment model may be modified based upon the user feedback. For example, if the user passed a user authentication challenge, then a decision structure (e.g., associated with a malicious user account context property pattern and/or a malicious authentication context property pattern) of the machine learning structure may be modified (e.g., removed, reduction of a confidence weight, etc.).

In an example, the risk assessment model may be applied to prior user account events of a user to generate an evaluation metric (e.g., an indication as to whether the user is safe, malicious, compromised, etc.). For example, the risk assessment model may be updated with new training data (e.g., newly identified malicious user account context property patterns and/or malicious authentication context property patterns) that may be used to retroactively block accounts that did malicious activities days/weeks/months ago, such as by clawing back emails, untrusting secondary identity claims such as alternative emails or phone numbers, removing friendship relationships, removing profile pictures, quarantining online content stored in cloud storage, etc. In this manner, prior false negatives may be identified and addressed. In another example, a banned user account of the user may be retroactively unbanned based upon the evaluation metric indicating that the user is safe. In this manner, the risk assessment model may inhibit false positives with regard to current user account events that may otherwise, for example, subject a non-malicious user to unnecessary authentication requirements. For example, the risk assessment model may be tuned so that users associated with certain user account events do not have to answer additional authentication questions, type in captchas, etc. Implementing the risk assessment model may thus not only improve security, but may also provide a streamlined and improved user experience by omitting unnecessary authentication requirements. At 118, the method ends.

Figure 2B:
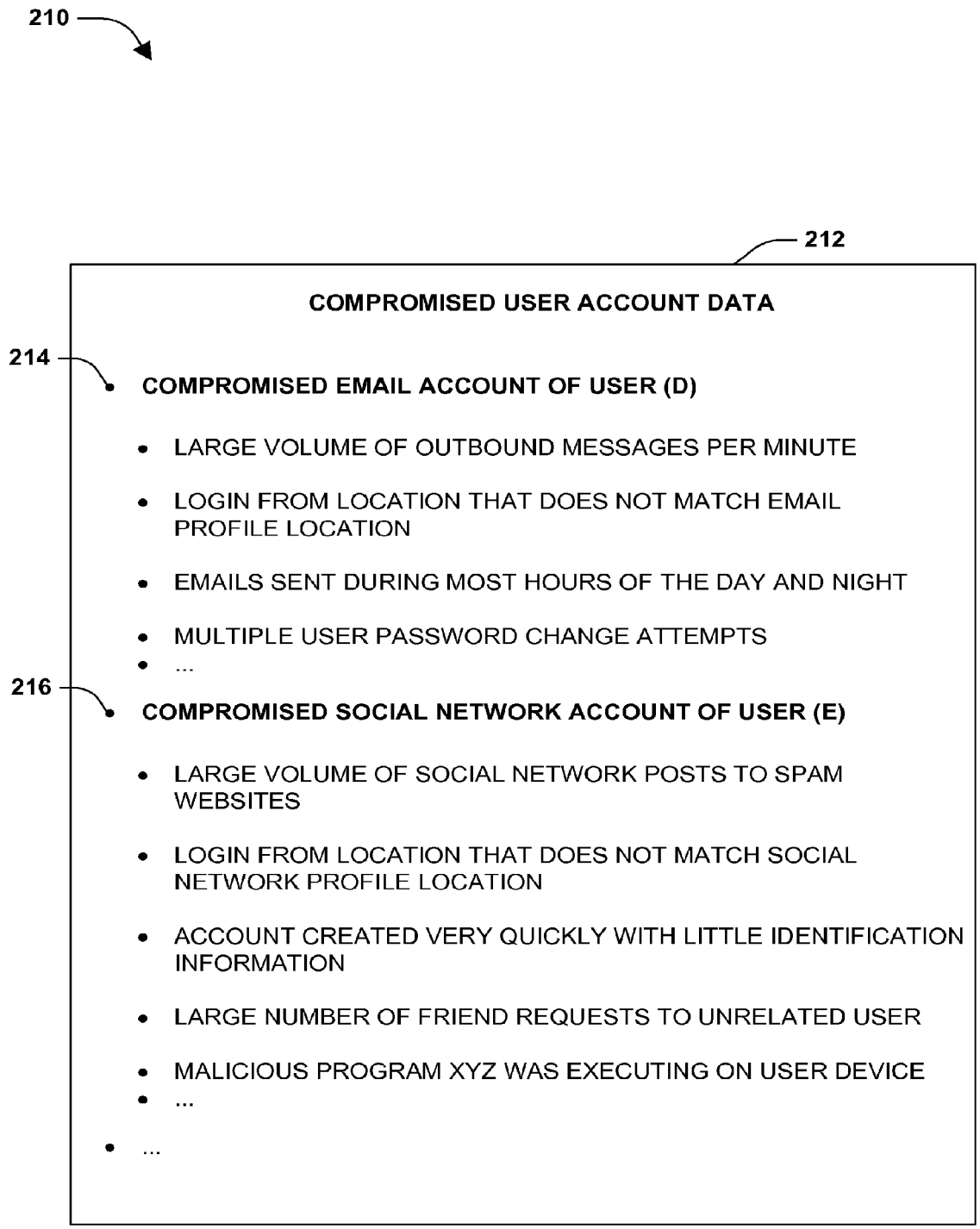
FIG. 2B is an illustration of exemplary compromised user account data.
Figure 2C:
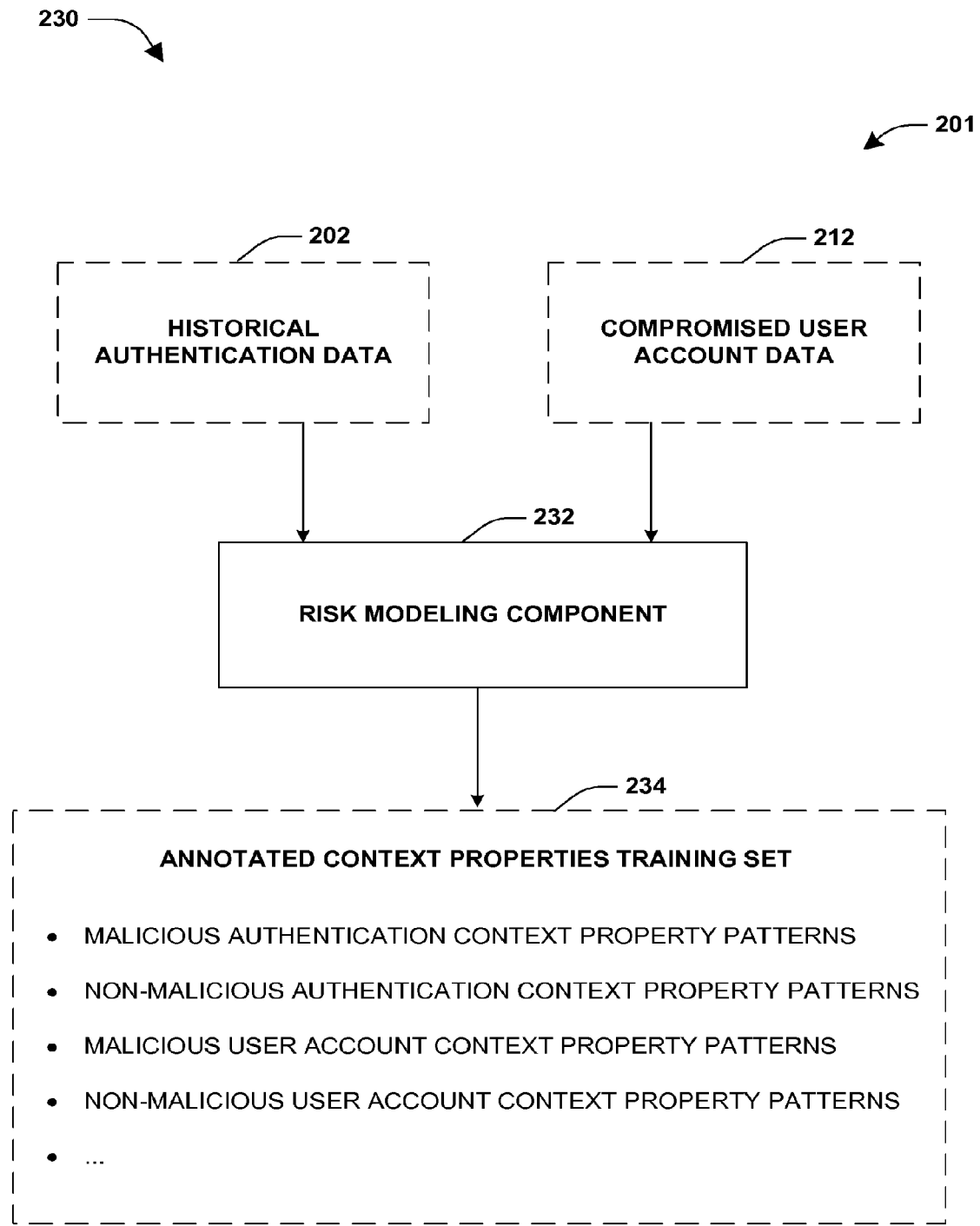
FIG. 2C is a component block diagram illustrating an exemplary system for generating a risk assessment model where an annotated context properties training set is created.

Turning to FIGS. 2A-2D, FIG. 2A illustrates an example 200 of historical authentication data 202, FIG. 2B illustrates an example 210 of compromised user account data 212 and FIGS. 2C and 2C illustrate examples of a system 201 for generating a risk assessment model. The historical authentication data 202 in FIG. 2A may comprise various telemetry data indicative of authentication context properties associated with user authentication sessions. For example, the historical authentication data 202 may indicate that user (A) visited a website www.wehack.com, has a user (A) social network profile with a location that did not match an IP address location of a device used to log into a user (A) bank account website, has interacted with a device using non-human keystroke patterns (e.g., keystrokes per minute above a human capability threshold), was unsuccessful at attempting large purchase transactions at various retail websites, etc.

The historical authentication data 202 may indicate that user (B) tends to log into a user (B) device from locations that match a user (B) social network profile, has interacted with the user (B) device using human keystrokes and mouse inputs, has a user (B) email account that does not appear to be compromised, etc. The historical authentication data 202 may be evaluated to identify a set of authentication context properties associated with user authentication sessions, which may be utilized to train a risk assessment model to identify safe user account events and/or malicious user account events (e.g., user context properties corresponding to user (A) account context properties may be indicative of a malicious user account event, while user context properties corresponding to user (B) account context properties may be indicative of a safe user account event).

With regard to the example 210 illustrated in FIG. 2B, the compromised user account data 212 comprises a first set of malicious account context properties 214 associated with a compromised email account of user (D) and a second set of malicious account context properties 216 associated with a compromised social network account of user (E). In an example, the first set of malicious account context properties 214 may indicate that the email account of user (D) had a large volume of outbound messages per minute, was logged into from locations that did not match an email profile location of user (D), that emails were sent during most hours of the day and night (e.g., indicating that user (D) either does not sleep or that malware took over the compromised email account), that multiple user password change attempts were made, etc. The second set of malicious account context properties 216 may indicate that the social network account of user (E) had a large volume of network posts promoting spam websites, was logged into from locations that did not match a social network profile location, that the account was created very quickly with little identification information, that a large number of friend requests were send to unrelated users (e.g., as opposed to a group of related users such as friends from the same schools as user (E)), that a malicious program xyz was executing on a user device, etc. The compromised user account data 212 may be evaluated to identify a set of malicious account context properties associated with compromised user accounts, which may be utilized to train a risk assessment model to identify safe user account events and/or malicious user account events (e.g., user context properties corresponding to the first set of malicious account context properties 214 and/or the second set of malicious account context properties 216 may be indicative of a malicious user account event).

FIG. 2C illustrates the system 201 comprising a risk modeling component 232. The risk modeling component 232 may be configured to evaluate the historical authentication data 202 to identify the set of authentication context properties and to annotate the set of authentication context properties and/or to evaluate the compromised user account data 212 to identify the set of malicious account context properties and to annotate the set of malicious account context properties to create an annotated context properties training set 234. The annotated context properties training set 234 may comprise malicious authentication context property patterns (e.g., users visiting the www.wehack.com website), non-malicious authentication context property patterns (e.g., users logging into user devices from locations that match social network profile locations), malicious user account context property patterns (e.g., quick creation of a social network account with little identification information), and/or non-malicious user account context property patterns (e.g., a social network user requesting friendship with related users, such as users from the same school).

Figure 2D:
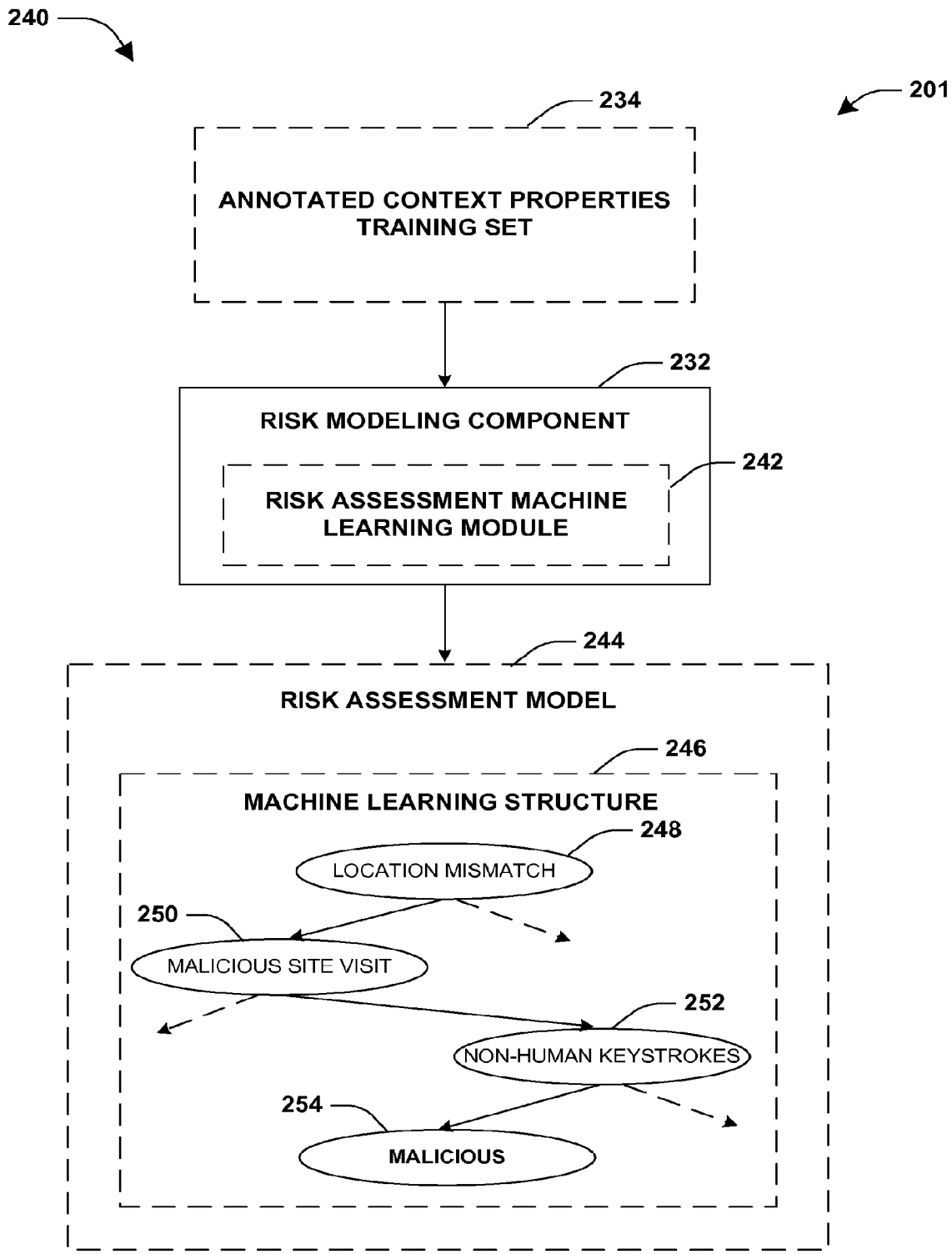
FIG. 2D is a component block diagram illustrating an exemplary system for generating a risk assessment model.

FIG. 2D illustrates the risk modeling component 232 generating a risk assessment model 244. The risk modeling component 232 may train a risk assessment machine learning module 242 using the annotated context properties training set 234 to generate the risk assessment model 244. In an example, one or more machine learning structures may be created for inclusion within the risk assessment model 244. For example, a machine learning structure 246 may be generated based upon annotated context properties within the annotated context properties training set 234.

The machine learning structure 246 may comprise a location mismatch decision structure 248 corresponding to a location mismatch annotated context property indicating that a likelihood of malicious activity may be increased when a user context property of a user account event indicates that a login location to a service is different than a profile location of the user (e.g., a user shopping account may be logged into at 9:00 am from China, and then logged into at 9:30 am from London, which may indicate that malicious malware, distributed across multiple nations, has taken over the user account). The machine learning structure 246 may comprise a malicious site visit decision structure 250 corresponding to a malicious site visit annotated context property indicating that a likelihood of malicious activity may be increased when a user context property of a user account event indicates that the user recently visited a malicious website/service. The machine learning structure 246 may comprise a non-human keystrokes decision structure 252 corresponding to a non-human keystrokes annotated context property indicating that a likelihood of malicious activity may be increased when a user context property of a user account event indicates that interaction with a computing device mimics non-human input behavior (e.g., keystrokes per minute above a human capability threshold). In this way, a user account event associated with one or more user context properties that satisfy the location mismatch decision structure 248, the malicious site visit decision structure 250, and/or the non-human keystrokes decision structure 252 may be assigned a risk analysis metric indicative of a degree of maliciousness 254 (e.g., the degree of maliciousness 254 may be increased by the number of decision structures that are satisfied and/or the degree to which one or more of the decision structures are satisfied (e.g., speed of keystrokes barely exceeding threshold)).

Figure 3A:
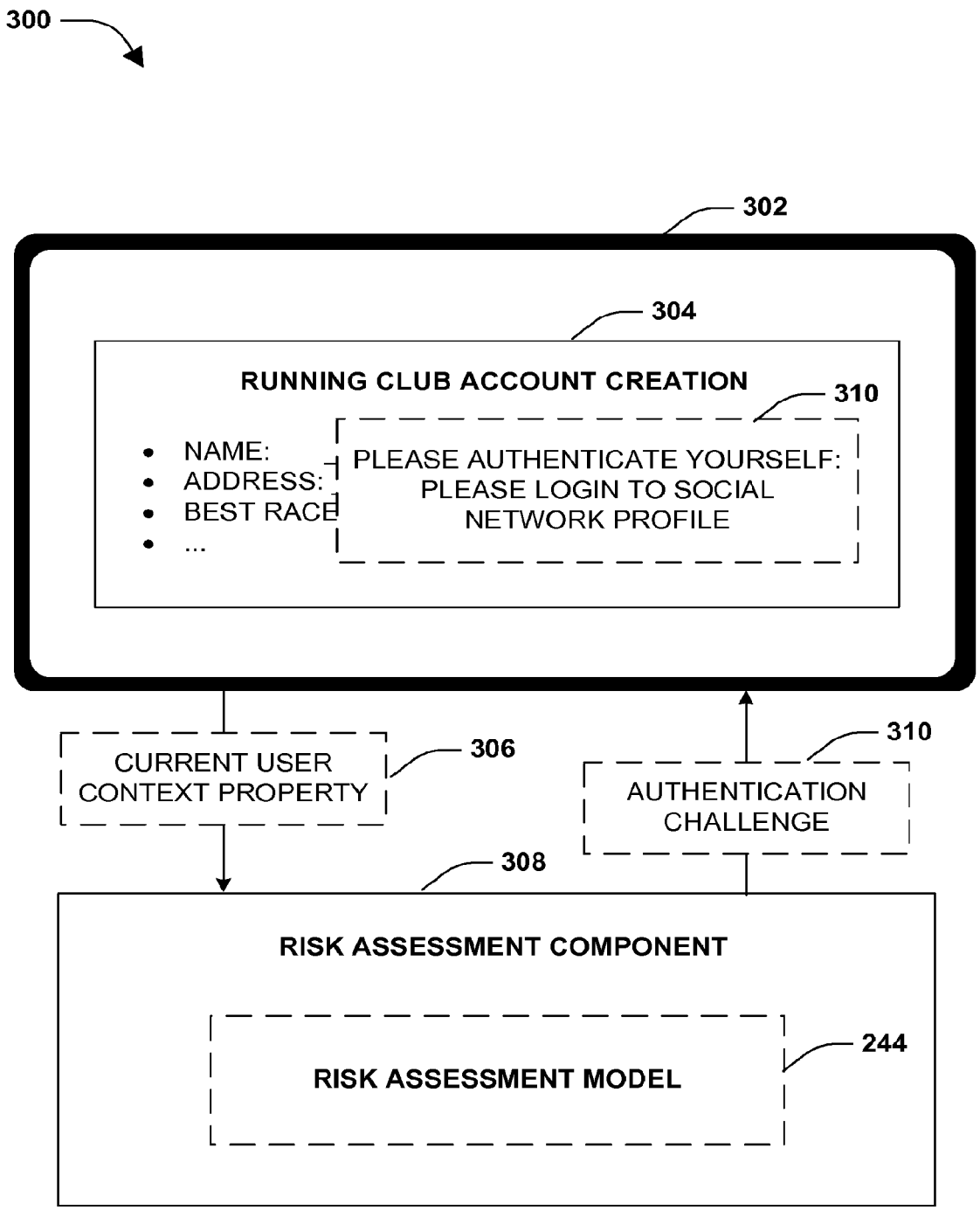
FIG. 3A is a component block diagram illustrating an exemplary system for risk assessment.

FIG. 3A illustrates an example of a system 300 for risk assessment. The system 300 comprises a risk assessment component 308. The risk assessment component 308 may be configured to identify a current user account event of a current user. For example, the current user may utilize a client device 302 to access a running club service. The current user may attempt to create a new running club account through a running club account creation interface 304. The attempt to create the new running club account may be identified by the risk assessment component 308 as the current user account event. The risk assessment component 308 may evaluate a current user context property 306 using the risk assessment model 244, illustrated in FIG. 2D, to generate a risk analysis metric. In an example, the risk analysis metric may indicate a likelihood that the current user may be compromised based upon the current user context property 306 satisfying one or more decision structures, within a machine learning structure of the risk assessment model 244, that are indicative of a likelihood of malicious activity. For example, the current user context property 306 may indicate that the current user logged in from an unknown location that does not match any locations associated with the current user, that the current user recently visited a malicious website, and/or that the current user may have interacted with a client device using non-human keystrokes. Such current user context properties may satisfy the location mismatch decision structure 248, the malicious site visit decision structure 250, and/or the non-human keystrokes decision structure 252 within the machine learning structure 246 of the risk assessment model 244 of FIG. 2D. In this way, the risk assessment component 308 may moderate the current user account event based upon the risk analysis metric. For example, the risk assessment component 308 may provide an authentication challenge 310 to the current user, which may have to be satisfied to continue the attempt to create the new running club account. It will be appreciated that abuse detection may be performed during sign-up for an account (e.g., a risk analysis metric may be generated for moderating the creation of the new running club account), during a login event for an account (e.g., a risk analysis metric may be generated for moderating a subsequent login by the user into the new running club account), and/or other various scenarios (e.g., a risk analysis metric may be generated for a password change event for the new running club account).

Figure 3B:
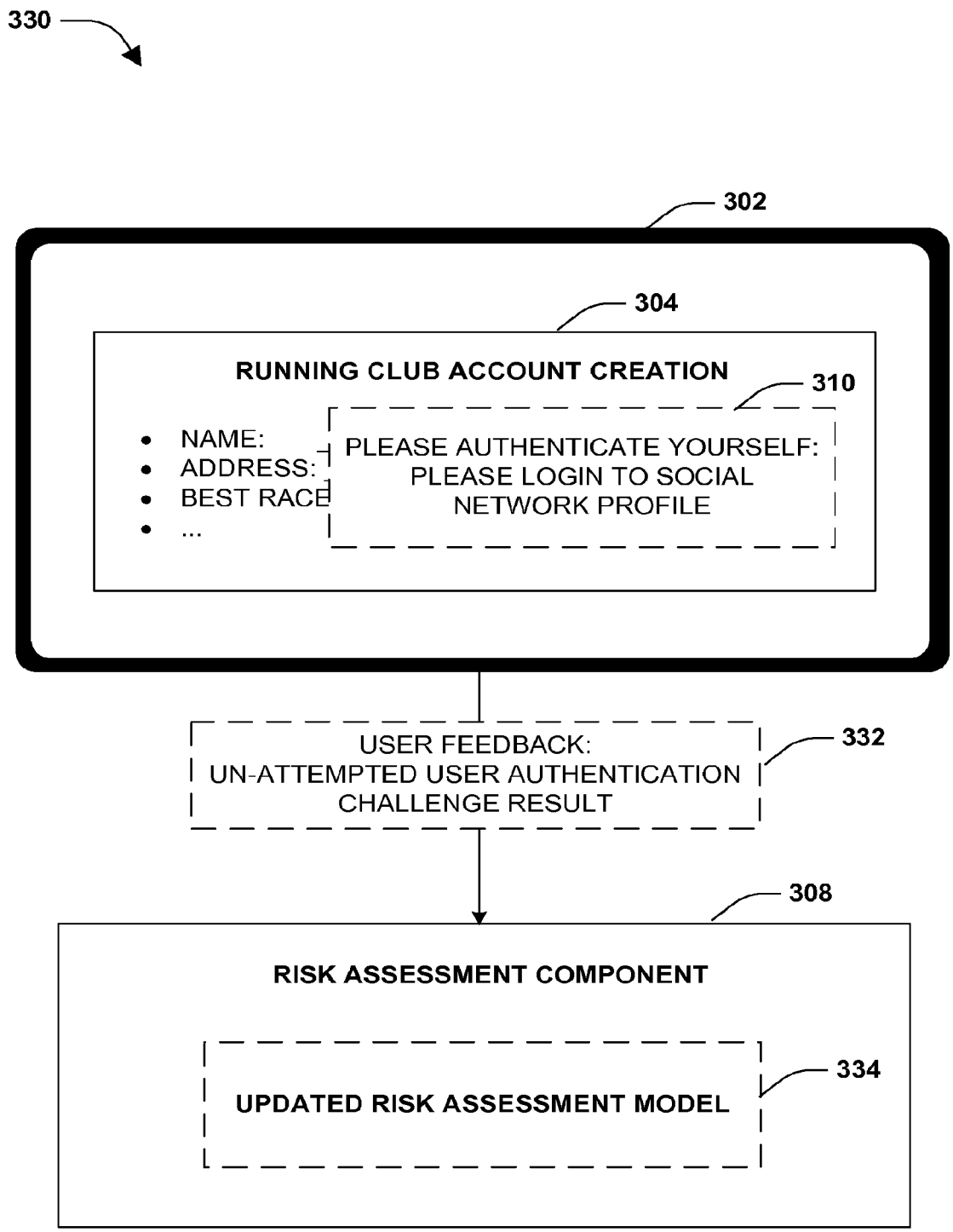
FIG. 3B is a component block diagram illustrating an exemplary system for risk assessment where user feedback is utilized to modify a risk assessment model.

FIG. 3B illustrates an example 330 of the risk assessment component 308 receiving user feedback 332 to the moderation of the current user account event. For example, the user feedback 332 may indicate that the current user did not attempt to complete the user authentication challenge 310 (e.g., provided in FIG. 3A), which may indicate that the current user account event was a malicious user account event. Accordingly, the risk assessment component 308 may modify the risk assessment model 244 of FIG. 3A based upon the user feedback 332 to create an updated risk assessment model 334. For example, confidence weights associated with one or more decision structures (e.g., the location mismatch decision structure 248, the malicious site visit decision structure 250, and/or the non-human keystrokes decision structure 252) used to identify a risk analysis metric for the current user account event may be increased because such decision structures may have resulted in an assessment of the current user account event that appears to be correct or at least validated by subsequent user (in)action.

Figure 4A:
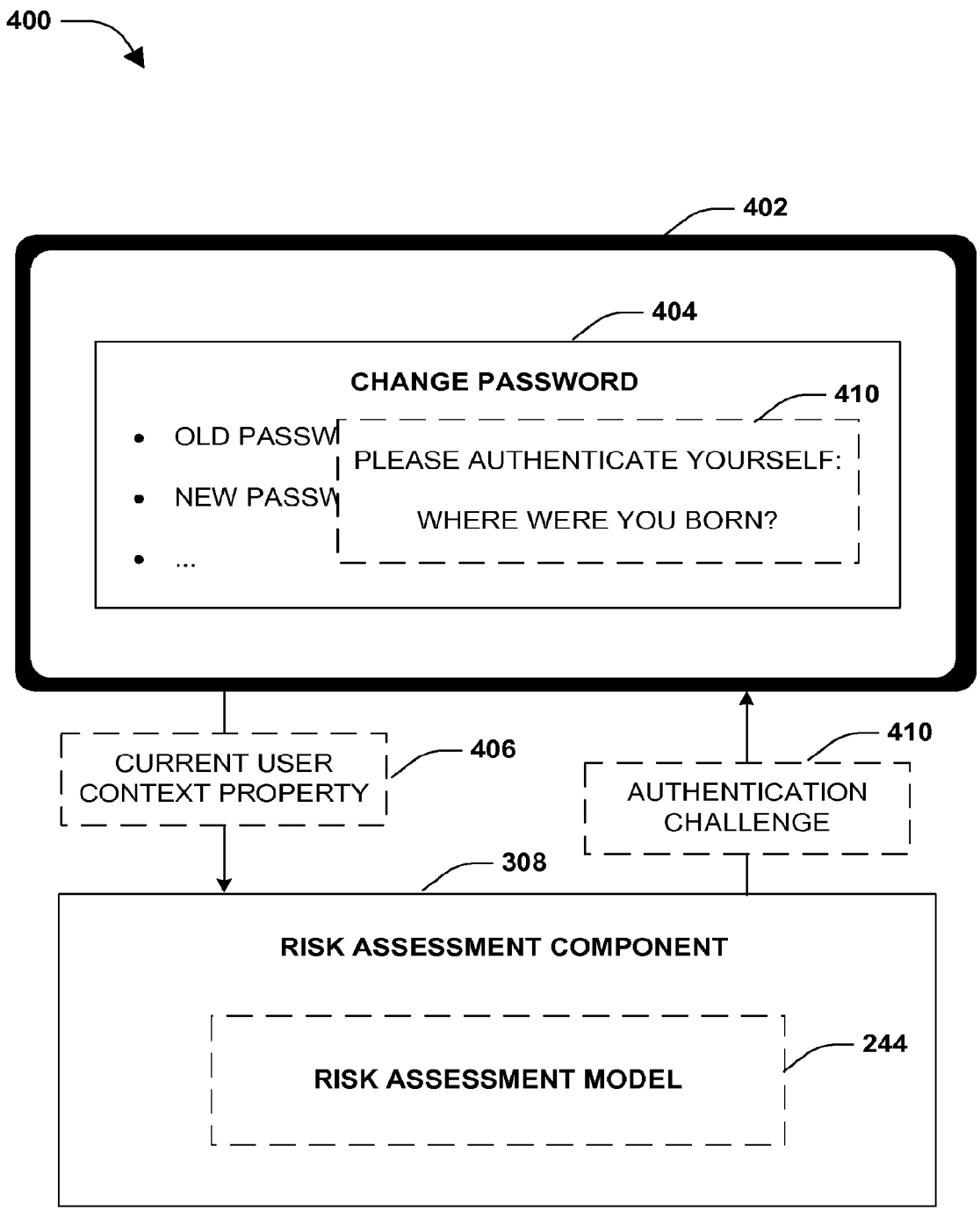
FIG. 4A is a component block diagram illustrating an exemplary system for risk assessment.

FIG. 4A illustrates an example of a system 400 for risk assessment. The system 400 comprises a risk assessment component 308. The risk assessment component 308 may be configured to identify a current user account event of a current user. For example, the current user may utilize a client device 402 to access a photo sharing service. The current user may attempt to change a password to the photo sharing service through a change password interface 404. The attempt to change the password may be identified by the risk assessment component 308 as the current user account event. The risk assessment component 308 may evaluate a current user context property 406 using the risk assessment model 244, illustrated in FIG. 2D, to generate a risk analysis metric. In an example, the risk analysis metric may indicate that the current user may be compromised based upon the current user context property 406 satisfying one or more decision structures, within a machine learning structure of the risk assessment model 244, indicating a likelihood of malicious activity. For example, the current user context property 406 may indicate that the current user logged in from an unknown location that does not match any locations associated with the current user, which may satisfy the location mismatch decision structure 248 within the machine learning structure 246 of the risk assessment model 244 of FIG. 2D. In this way, the risk assessment component 308 may moderate the current user account event based upon the risk analysis metric. For example, the risk assessment component 308 may provide an authentication challenge 410 to the current user, which may need to be satisfied to continue the attempt to change the password.

Figure 4B:
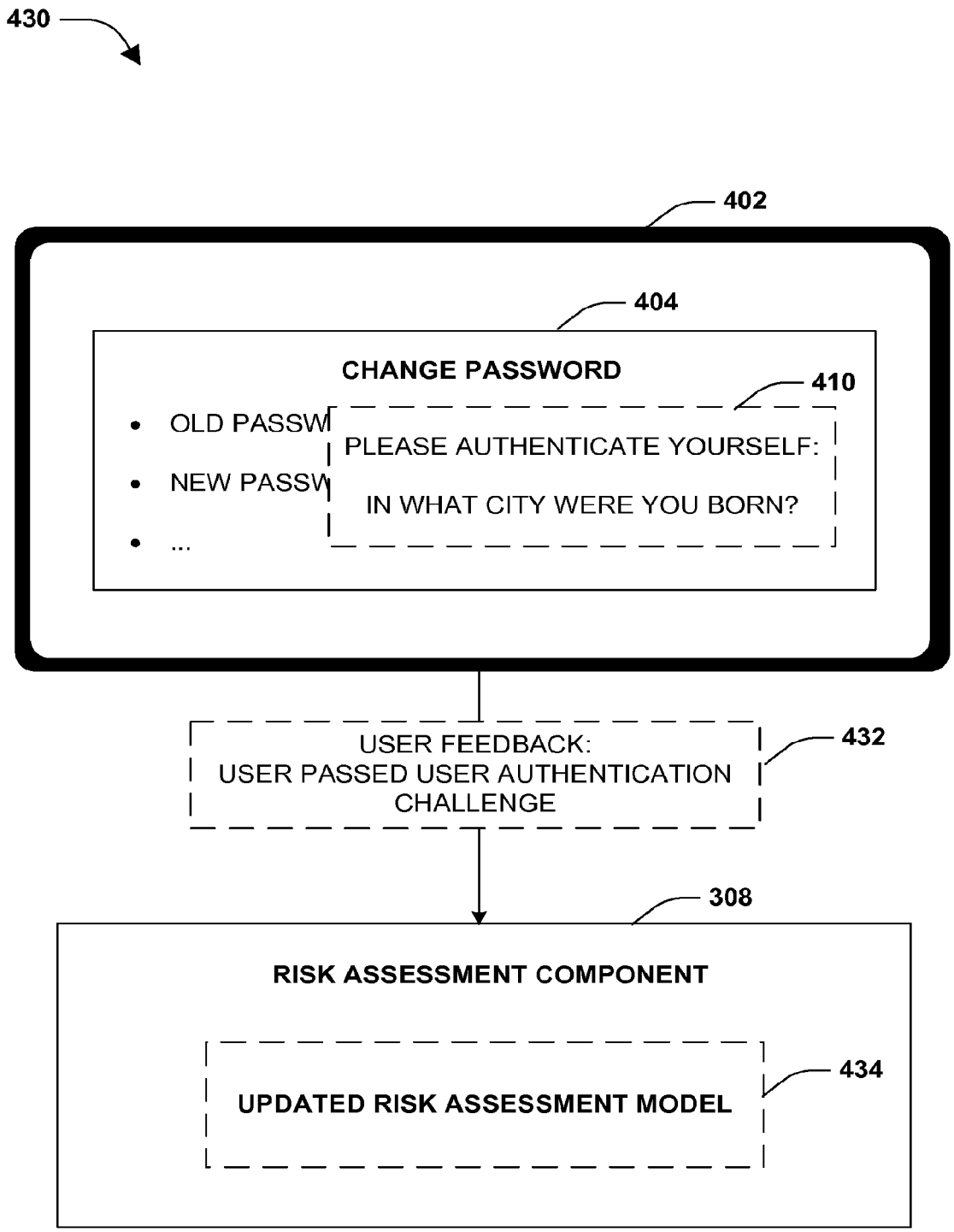
FIG. 4B is a component block diagram illustrating an exemplary system for risk assessment where user feedback is utilized to modify a risk assessment model.

FIG. 4B illustrates an example 430 of the risk assessment component 308 receiving user feedback 432 to the moderation of the current user account event. For example, the user feedback 432 may indicate that the current user passed the user authentication challenge 410 (e.g., provided in FIG. 4A), which may indicate that the current user account event was not a malicious user account event. Accordingly, the risk assessment component 408 may modify the risk assessment model 244 of FIG. 4A based upon the user feedback 432 to create an updated risk assessment model 434. For example, confidence weights associated with one or more decision structures used to identify a risk analysis metric for the current user account event (e.g., the location mismatch decision structure 248) may be decreased because such decision structures may have resulted in an incorrect assessment of the current user account event as malicious.

Figure 5:
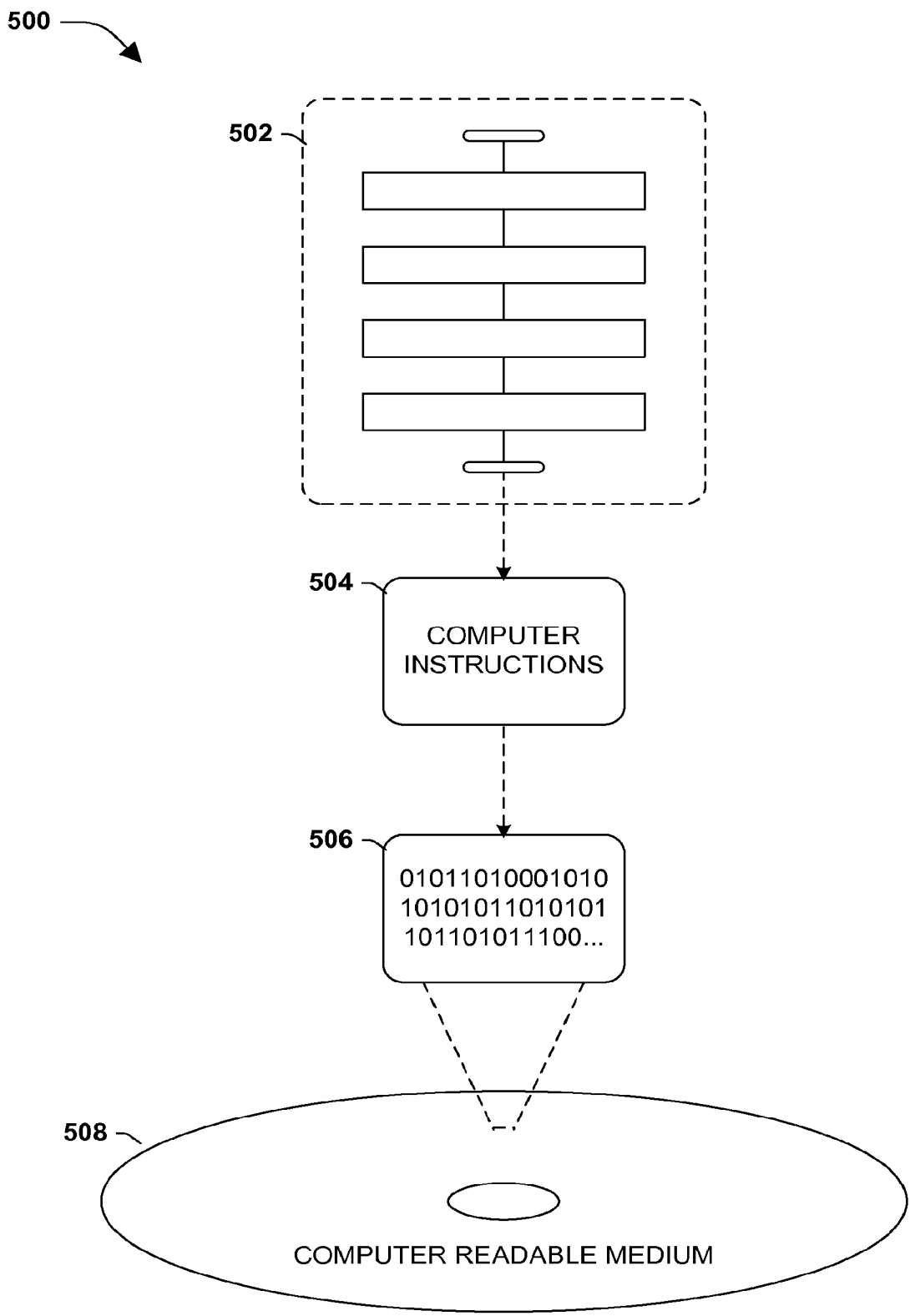
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, for example. In some embodiments, the processor-executable instructions 504 are configured to implement a system, such as at least some of the exemplary system 201 of FIGS. 2C and 2D, at least some of the exemplary system 300 of FIG. 3, and/or at least some of the exemplary system 400 of FIG. 4, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
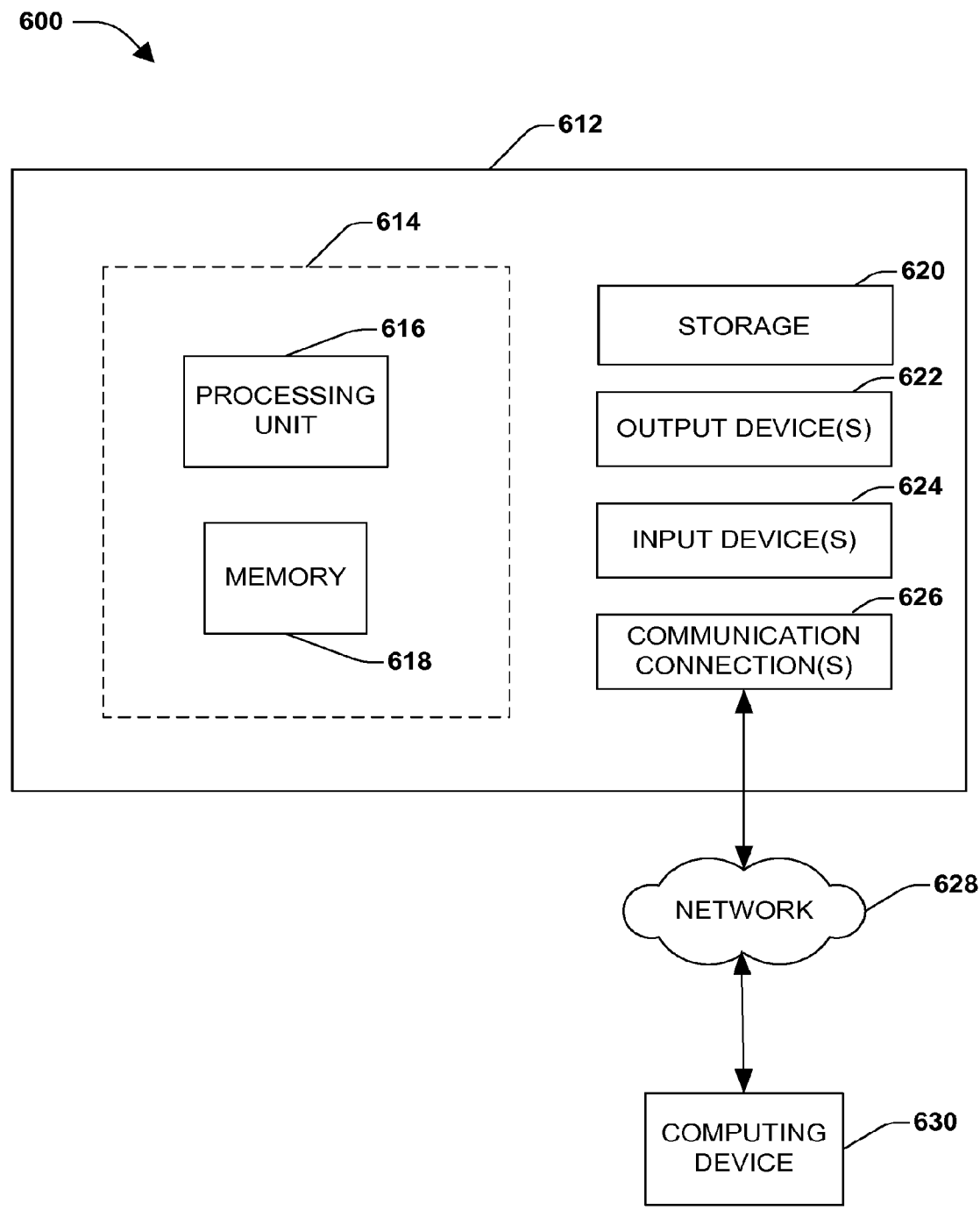
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computer system for risk assessment, comprising:
one or more processor; and
one or more storage devices having stored thereon computer-executable instructions, which are executable by the one or more processors to cause the computer system to:
   evaluate historical authentication data to identify a set of authentication context properties associated with user authentication sessions;
   evaluate compromised user account data to identify a set of malicious account context properties associated with at least one of compromised user accounts or compromised user authentication events;
   annotate the set of authentication context properties and the set of malicious account context properties to create an annotated context properties training set;
   train a plurality of risk assessment machine learning modules based upon the annotated context properties training set to generate a plurality of risk assessment models, wherein each risk assessment model is responsive to a predefined context property;
   identify a current user account event of a current user;
   evaluate a first current user context property of the current user using a first risk assessment model;
   evaluate a second current user context property of the current user using a second risk assessment model;
   aggregate results from the first and the second risk assessment models to generate a risk analysis metric;
   moderate the current user account event based upon the risk analysis metric, wherein the current user account event is moderated by the computing system blocking the current user for a current session of the current user account event.

2. The computer system according to claim 1, wherein the second current user context property is evaluated based on a first result obtained from the first risk assessment model.

3. The computing system of claim 2, wherein the first result obtained from the first risk assessment model indicates that one or more user context properties are indicative of either a malicious user account event or a safe user account event.

4. The computing system of claim 1, the annotated context properties training set is annotated in response to the computing system:
   evaluating the set of malicious account context properties to identify a user account context property pattern indicative of at least one of a compromised user account or a compromised user authentication event; and
   annotating the user account context property pattern as malicious to create a malicious user account context property pattern for inclusion within the annotated context property training set.

5. The computing system of claim 1, wherein the computer-executable instructions are further executable by the one or more processors to cause the computer system to:
   receive user feedback to the moderation of the current user account event; and
   based on the user feedback, to modify one or more confidence weights associated with one or more decision structures to update one or more of the plurality of risk assessment models.

6. The computing system of claim 1, wherein the current user account event is moderated by the computing system performing one or more:
   providing restricted access to a destination; or
   allowing the user to proceed unimpeded.

7. One or more hardware storage devices having stored thereon computer-executable instructions, which are executable by one or more processors of a computing system to cause the computer system to:
   evaluate historical authentication data to identify a set of authentication context properties associated with user authentication sessions;
   evaluate compromised user account data to identify a set of malicious account context properties associated with at least one of compromised user accounts or compromised user authentication events;
   annotate the set of authentication context properties and the set of malicious account context properties to create an annotated context properties training set;
   train a plurality of risk assessment machine learning modules based upon the annotated context properties training set to generate a plurality of risk assessment models, wherein each risk assessment model is responsive to a predefined context property;

identify a current user account event of a current user;
evaluate a first current user context property of the current user using a first risk assessment model;
evaluate a second current user context property of the current user using a second risk assessment model;
aggregate results from the first and the second risk assessment models to generate a risk analysis metric; and
moderate the current user account event based upon the risk analysis metric, wherein the current user account event is moderated by the computing system blocking the current user for a current session of the current user account event.

8. The one or more hardware storage device according to claim 7, wherein the second current user context property is evaluated based on a first result obtained from the first risk assessment model.

9. The one or more hardware storage device of claim 8, wherein the first result obtained from the first risk assessment model indicates that one or more user context properties are indicative of either a malicious user account event or a safe user account event.

10. The one or more hardware storage device of claim 7, the annotated context properties training set is annotated in response to the computing system:
evaluating the set of malicious account context properties to identify a user account context property pattern indicative of at least one of a compromised user account or a compromised user authentication event; and
annotating the user account context property pattern as malicious to create a malicious user account context property pattern for inclusion within the annotated context property training set.

11. The one or more hardware storage device of claim 7, wherein the computer-executable instructions are further executable by the one or more processors to cause the computer system to:
receive user feedback to the moderation of the current user account event; and
based on the user feedback, to modify one or more confidence weights associated with one or more decision structures to update one or more of the plurality of risk assessment models.

12. The one or more hardware storage device of claim 7, wherein the current user account event is moderated by the computing system performing one or more:
blocking the current user until a user response is received; or
providing an authentication challenge to the current user.

13. A computer implemented method for risk assessment, comprising:
a computer system evaluating historical authentication data to identify a set of authentication context properties associated with user authentication sessions;
a computer system evaluating compromised user account data to identify a set of malicious account context properties associated with at least one of compromised user accounts or compromised user authentication events;
a computer system annotating the set of authentication context properties and the set of malicious account context properties to create an annotated context properties training set;
a computer system training a plurality of risk assessment machine learning modules based upon the annotated context properties training set to generate a plurality of risk assessment models, wherein each risk assessment model is responsive to a predefined context property;
a computer system identifying a current user account event of a current user;
a computer system evaluating a first current user context property of the current user using a first risk assessment model;
a computer system evaluating a second current user context property of the current user using a second risk assessment model;
a computer system aggregating results from the first and the second risk assessment models to generate a risk analysis metric; and
a computer system moderating the current user account event based upon the risk analysis metric, wherein the current user account event is moderated by the computing system blocking the current user for a current session of the current user account event.

14. The method according to claim 13, wherein the second current user context property is evaluated based on a first result obtained from the first risk assessment model.

15. The method of claim 14, wherein the first result obtained from the first risk assessment model indicates that one or more user context properties are indicative of either a malicious user account event or a safe user account event.

16. The method of claim 13, wherein the annotated context properties training set is annotated in response to the computing system:
evaluating the set of malicious account context properties to identify a user account context property pattern indicative of at least one of a compromised user account or a compromised user authentication event; and
annotating the user account context property pattern as malicious to create a malicious user account context property pattern for inclusion within the annotated context property training set.

17. The method of claim 13, wherein the computer-executable instructions are further executable by the one or more processors to cause the computer system to:
receive user feedback to the moderation of the current user account event; and
based on the user feedback, to modify one or more confidence weights associated with one or more decision structures to update one or more of the plurality of risk assessment models.

18. The method of claim 13, wherein the current user account event is moderated by the computing system demoting a reputation of the current user.

19. The method of claim 13, wherein the method further includes retroactively banning the current user account based upon the evaluation metric.

* * * * *